(12) United States Patent
Dai et al.

(10) Patent No.: US 12,551,184 B2
(45) Date of Patent: Feb. 17, 2026

(54) ULTRASOUND IMAGING METHOD, ULTRASOUND IMAGING SYSTEM, AND NON-TRANSITORY COMPUTER-READABLE MEDIUM

(71) Applicant: GE Precision Healthcare LLC, Waukesha, WI (US)

(72) Inventors: Renjie Dai, Wuxi (CN); Nan Zhou, Wuxi (CN); Jintao Zhang, Wuxi (CN)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/677,592

(22) Filed: May 29, 2024

(65) Prior Publication Data

US 2024/0398371 A1  Dec. 5, 2024

(30) Foreign Application Priority Data

May 31, 2023  (CN) .......................... 202310634593.6

(51) Int. Cl.
*A61B 8/06*  (2006.01)
*A61B 8/00*  (2006.01)
*A61B 8/08*  (2006.01)

(52) U.S. Cl.
CPC .............. *A61B 8/06* (2013.01); *A61B 8/463* (2013.01); *A61B 8/469* (2013.01); *A61B 8/488* (2013.01); *A61B 8/54* (2013.01)

(58) Field of Classification Search
CPC ........... A61B 8/06; A61B 8/463; A61B 8/469; A61B 8/488; A61B 8/54; A61B 8/461; A61B 8/467; A61B 8/465
See application file for complete search history.

(56) References Cited

U.S. PATENT DOCUMENTS

| | | | |
|---|---|---|---|
| 7,106,313 B2 | 9/2006 | Schena | |
| 7,972,141 B2 | 7/2011 | Morris | |
| 10,316,492 B2 | 6/2019 | Kassen | |
| 2012/0016235 A1* | 1/2012 | Lee | G01S 7/52074 600/437 |
| 2015/0289838 A1* | 10/2015 | Nichol | A61B 8/04 600/459 |
| 2017/0086785 A1* | 3/2017 | Bjaerum | A61B 8/4444 |
| 2018/0169520 A1 | 6/2018 | Hui | |

FOREIGN PATENT DOCUMENTS

WO   1990000366 A1   1/1990

* cited by examiner

*Primary Examiner* — Anne M Kozak
*Assistant Examiner* — Kaitlyn E Sebastian
(74) *Attorney, Agent, or Firm* — SPQ IP LLC

(57) ABSTRACT

An ultrasound imaging method, including: using a probe to perform real-time ultrasound imaging on a site to be imaged so as to generate an ultrasound image of the site to be imaged; receiving a location selection on the ultrasound image from an input device; acquiring blood flow information at the selected location on the ultrasound image; and on the basis of the blood flow information at the selected location, in real time, controlling the input device to generate force feedback. Other embodiments of the present application further provide an ultrasound imaging system and a non-transitory computer-readable medium.

14 Claims, 5 Drawing Sheets

ULTRASOUND IMAGING METHOD, ULTRASOUND IMAGING SYSTEM, AND NON-TRANSITORY COMPUTER-READABLE MEDIUM

CROSS-REFERENCE TO RELATED APPLICATION

This application claim priority to Chinese Patent Application No. 202310634593.6, which was file on May 31, 2023 at the Chinese Patent Office. The entire contents of the above-listed application are incorporated by reference herein in their entirety.

TECHNICAL FIELD

The present invention relates to the field of ultrasound imaging and, in particular, to an ultrasound imaging method, an ultrasound imaging system, and a non-transitory computer-readable medium.

BACKGROUND

Ultrasound imaging technology is a real-time, non-destructive imaging technology that employs a probe to receive an ultrasonic echo signal from a site to be imaged, and processes the ultrasonic echo signal to perform real-time imaging. Different ultrasound imaging modes may acquire different information at the site to be imaged. For example, blood flow information at a site of interest may be acquired in some ultrasound modes. These ultrasound modes include, but are not limited to, color Doppler imaging, spectral Doppler imaging, etc.

When acquiring the blood flow information of a site of interest, an operator generally needs to hold an ultrasound probe in one hand for correct positioning on the body surface of a person to be scanned, and needs to control an input device (e.g., a trackball or a touchpad) or the like with the other hand to choose a location on an ultrasound image where blood flow information needs to be acquired. The selected location often moves due to interference from certain external factors, such as movement of the body of the person to be scanned, and inadvertent movement of the probe by the operator. These subtle factors may lead to deviation of the already selected location such that it is difficult to perceive by the scanner.

SUMMARY

The aforementioned defects, deficiencies, and problems are solved herein, and these problems and solutions will be understood by reading and understanding the following description.

Some embodiments of the present application provide an ultrasound imaging method, comprising using a probe to perform real-time ultrasound imaging on a site to be imaged so as to generate an ultrasound image of the site to be imaged; receiving a location selection on the ultrasound image from an input device; acquiring blood flow information at the selected location on the ultrasound image; and on the basis of the blood flow information at the selected location, in real time, controlling the input device to generate force feedback.

Some embodiments of the present application further provide an ultrasound imaging system, comprising: a probe for sending an ultrasound signal to a site to be imaged and receiving an echo signal from the site to be imaged; an input device for receiving an input from a user to control the system; a processor; and a display apparatus for receiving a signal from the processor and performing display. The processor is used to execute the following method: using a probe to perform real-time ultrasound imaging on a site to be imaged so as to generate an ultrasound image of the site to be imaged; receiving a location selection on the ultrasound image from an input device; acquiring blood flow information at the selected location on the ultrasound image; and on the basis of the blood flow information at the selected location, in real time, controlling the input device to generate force feedback.

Some other embodiments of the present application further provide a non-transitory computer-readable medium, the non-transitory computer-readable medium has a computer program stored thereon, the computer program has at least one code segment, and the at least one code segment is executable by a machine so as to enable the machine to execute the following steps: using a probe to perform real-time ultrasound imaging on a site to be imaged so as to generate an ultrasound image of the site to be imaged; receiving a location selection on the ultrasound image from an input device; acquiring blood flow information at the selected location on the ultrasound image; and on the basis of the blood flow information at the selected location, in real time, controlling the input device to generate force feedback.

It should be understood that the brief description above is provided to introduce, in a simplified form, concepts that will be further described in the detailed description. It does not mean to identify key or essential features of the claimed subject matter whose scope is defined uniquely by the claims that follow the detailed description. In addition, the claimed subject matter is not limited to implementations that solve any deficiencies raised above or in any section of the present disclosure.

BRIEF DESCRIPTION OF THE DRAWINGS

The present application will be better understood by reading the following description of non-limiting embodiments with reference to the accompanying drawings, where.

DETAILED DESCRIPTION

Specific embodiments of the present invention will be described below. It should be noted that in the specific description of the embodiments, it is impossible to describe all features of the actual embodiments of the present invention in detail, for the sake of brief description. It should be understood that in the actual implementation process of any embodiment, just as in the process of any one engineering project or design project, a variety of specific decisions are often made to achieve specific goals of the developer and to meet system-related or business-related constraints, which may also vary from one embodiment to another. Furthermore, it should also be understood that although efforts made in such development processes may be complex and tedious, for a person of ordinary skill in the art related to the content disclosed in the present invention, some design, manufacture, or production changes made on the basis of the technical content disclosed in the present disclosure are only common technical means, and should not be construed as the content of the present disclosure being insufficient.

Unless otherwise defined, the technical or scientific terms used in the claims and the description should be as they are usually understood by those possessing ordinary skill in the technical field to which they belong. "First", "second", and similar words used in the present invention and the claims do not denote any order, quantity, or importance, but are merely intended to distinguish between different constituents. The terms "one" or "a/an" and similar terms do not express a limitation of quantity, but rather that at least one is present. The terms "include" or "comprise" and similar words indicate that an element or object preceding the terms "include" or "comprise" encompasses elements or objects and equivalent elements thereof listed after the terms "include" or "comprise", and do not exclude other elements or objects. The terms "connect" or "link" and similar words are not limited to physical or mechanical connections, and are not limited to direct or indirect connections.

Figure 1:
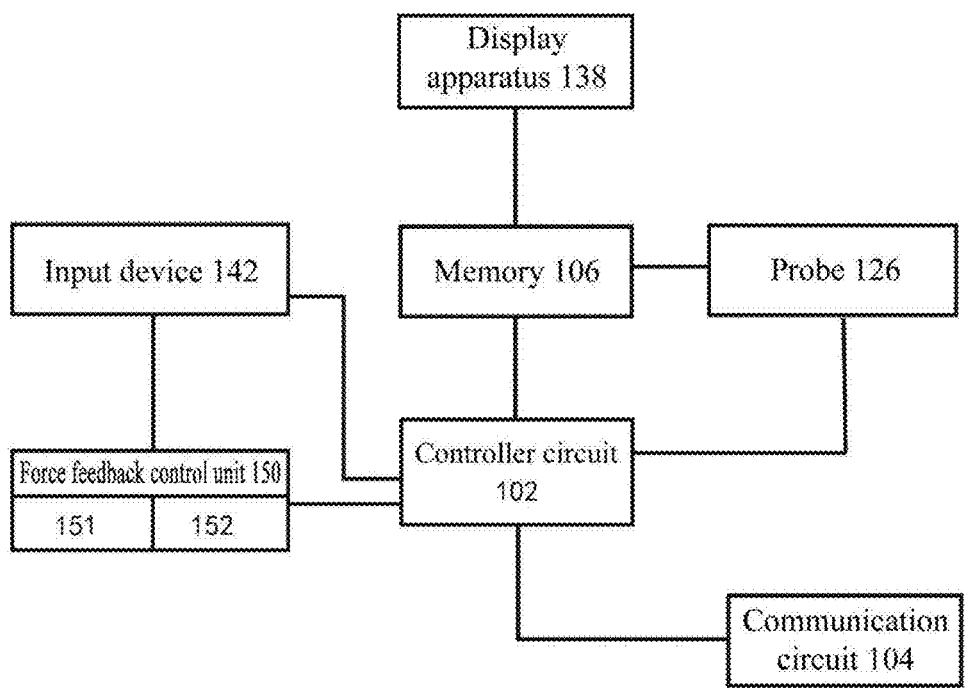
FIG. 1 is a schematic diagram of an ultrasound imaging system according to some embodiments of the present application.

FIG. 1 shows a schematic block diagram of an embodiment of an ultrasound imaging system 100. The ultrasound imaging system 100 may comprise a controller circuit 102, a display apparatus 138, an input device 142, a probe 126 and a memory 106, which can be operatively connected to a communication circuit 104.

The controller circuit 102 is configured to control operation of the ultrasonic imaging system 100. The controller circuit 102 may comprise one or more processors. Optionally, the controller circuit 102 may comprise a central processing unit (CPU), one or more microprocessors, a graphics processing unit (GPU), or any other electronic component capable of processing inputted data according to a specific logic instruction. Optionally, the controller circuit 102 may comprise and/or represent one or more hardware circuits or circuit systems, and the hardware circuit or circuit system comprises, is connected to, or comprises and is connected to one or more processors, controllers, and/or other hardware logic-based apparatuses. Additionally or alternatively, the controller circuit 102 may execute an instruction stored on a tangible and non-transitory computer-readable medium (e.g., the memory 106).

The controller circuit 102 may be operatively connected to and/or control the communication circuit 104. The communication circuit 104 is configured to receive and/or transmit information along a bidirectional communication link with one or more alternate ultrasound imaging systems, remote servers, etc. The remote server may represent patient information, a machine learning algorithm, a remotely stored medical image from a previous scan, and/or a diagnosis and treatment period of a patient, etc. The communication circuit 104 may represent hardware for transmitting and/or receiving data along a bidirectional communication link. The communication circuit 104 may include a transceiver, a receiver, etc., and an associated circuit system (e.g., an antenna) for communicating (e.g., transmitting and/or receiving) with the one or more alternate ultrasound imaging systems, remote servers, etc., by using a wired and/or wireless means. For example, protocol firmware for transmitting and/or receiving data along a bidirectional communication link may be stored in the memory 106 accessed by the controller circuit 102. The protocol firmware provides network protocol syntax to the controller circuit 102 so as to assemble a data packet, establish and/or segment data received along the bidirectional communication link, and so on.

The bidirectional communication link may be a wired (e.g., by means of a physical conductor) and/or wireless communication (e.g., utilizing a radio frequency (RF)) link for exchanging data (e.g., a data packet) between the one or more alternative ultrasound imaging systems, remote servers, etc. The bidirectional communication link may be based on a standard communication protocol, such as Ethernet, TCP/IP, Wi-Fi, 802.11, a customized communication protocol, Bluetooth, etc.

The controller circuit 102 is operatively connected to the display apparatus 138 and the input device 142. The display apparatus 138 may include one or more liquid crystal display apparatuses (e.g., light emitting diode (LED) backlights), organic light emitting diode (OLED) display apparatuses, plasma display apparatuses, cathode-ray tube (CRT) display apparatuses, and the like. The display apparatus 138 may display patient information received by the display apparatus 138 from the controller circuit 102, one or more medical images and/or videos, a graphical user interface (GUI) or a component, one or more 2D, 3D, or 4D ultrasound image data sets from ultrasound data stored in the memory 106, or anatomical measurement, diagnosis, processing information and the like currently acquired in real time.

The input device 142 controls operation of the controller circuit 102 and the ultrasound imaging system 100. The input device 142 is configured to receive an input from a clinician and/or an operator of the ultrasound imaging system 100. The input device 142 may include a keyboard, a mouse, a trackball, a touchpad, one or more physical buttons, and the like. Optionally, the display apparatus 138 may be a touch screen display apparatus that includes at least one part of the input device 142. For example, one part of the input device 142 may correspond to a graphical input device (GUI) that is generated by the controller circuit 102 and shown on the display apparatus 138. The touch screen display apparatus may detect the presence of a touch from the operator on the display apparatus 138, and may also identify the location of the touch relative to the surface area of the display apparatus 138. For example, a user may select, by touching or contacting the display apparatus 138, one or more input device components of the graphical input device (GUI) shown on the display apparatus. The input device component may correspond to icons, text boxes, menu bars, etc., shown on the display apparatus 138. A clinician may send an instruction to the controller circuit 102 to execute one or more operations described in the present application, by selection, control and use of the input device component, interaction with the same, and so on. For example, a touch may be applied using at least one among a hand, a glove, a stylus, and the like. The clinician may perform a series of operations using the input device 142. For example, the clinician may select an appropriate imaging mode (e.g., color flow Doppler mode, spectral Doppler mode), switch between the imaging modes, or move a cursor, etc.

In an alternative embodiment, the ultrasound imaging system 100 may further include a force feedback control unit 150. As shown in FIG. 1, the force feedback control unit 150 may be connected to the input device 142 for receiving a signal from the processor of the controller circuit 102 to make force feedback regulation to the input device 142. The force feedback may take various forms, and in some embodiments, may include a vibration feedback. The vibration feedback may include a strength of the vibration, a frequency of the vibration, or a combination thereof. In some other embodiments, the force feedback may also include a feedback of pressing resistance. The pressing resistance may be interpreted as a repulsive force that an operator can feel when pressing the input device 142. For example, when an operator presses the touch ball, the keyboard, or the touchpad, the input device is typically pressed down a certain distance to generate an input signal. Accordingly, the pressing process will encounter an upward repulsive force, namely, pressing resistance, from the device. In some embodiments of the present application, the force feedback is configured to be able to increase or decrease the aforementioned pressing resistance. The specific structure of the force feedback control unit 150 may be any one in the prior art. For example, it may include a vibration feedback control unit 151 and a pressing resistance control unit 152. Under the teachings of the present disclosure, any adjustable apparatus capable of generating a vibration may be used as the vibration feedback control unit 151, and any adjustable apparatus capable of adjusting the magnitude of resistance may be used as the pressing resistance control unit 152. An exemplary implementation of these control units will be described below.

With further reference to FIG. 1, the ultrasound imaging system 100 may include a probe 126. The probe 126 has elements such as an ultrasonic transducer, a transmitter, a transmitted beam former, a detector/SAP electronics, etc., (not shown). The detector/SAP electronics may be used to control the switching of the transducer elements. The detector/SAP electronics may also be used to group the transducer elements into one or more sub-holes. Configurations of the probe 126 will also be described below exemplarily.

The probe 126 may be configured to acquire ultrasound data or information from an anatomical structure of interest (e.g., organs, blood vessels, heart, bones, etc.) of a patient. The probe 126 is communicatively connected to the controller circuit by means of the transmitter. The transmitter transmits a signal to the transmitted beam former on the basis of the acquisition settings received by the controller circuit 102. The acquisition settings may define the amplitude, pulse width, frequency, gain setting, scanning angle, power, time gain compensation (TGC), resolution, and the like of the ultrasonic pulses emitted by the ultrasonic transducer. The ultrasonic transducer emits a pulsed ultrasonic signal into a patient (e.g., the body). The acquisition settings may be defined by a user operating the input device 142. The signal transmitted by the transmitter, in turn, drives the ultrasonic transducer.

The ultrasonic transducer transmits the pulsed ultrasonic signal to a body (e.g., a patient) or a volume that corresponds to an acquisition setting along one or more scanning planes. The ultrasonic signal may include, for example, one or more reference pulses, one or more push pulses (e.g., shear waves), and/or one or more pulsed wave Doppler pulses. At least a portion of the pulsed ultrasonic signal is backscattered from a tissue to be imaged (e.g., an organ, bone, heart, breast tissue, liver tissue, cardiac tissue, prostate tissue, newborn brain, embryo, abdomen, etc.) to produce an echo. Depending on the depth or movement, the echo is delayed in time and/or frequency, and received by the ultrasonic transducer. The ultrasonic signal may be used for imaging, for producing and/or tracking a shear wave, for measuring changes in location or velocity within the anatomical structure and a compressive displacement difference (e.g., strain) of tissue, and/or for treatment and other applications. For example, the probe 126 may deliver low energy pulses during imaging and tracking, deliver medium and high energy pulses to produce shear waves, and deliver high energy pulses during treatment.

The ultrasonic transducer converts a received echo signal into an electrical signal that can be received by the receiver. The receiver may include one or more amplifiers, analog/digital converters (ADCs), and the like. The receiver may be configured to amplify the received echo signal after appropriate gain compensation, and convert these analog signals received from each transducer element into a digitized signal that is temporally uniformly sampled. The digitized signals representing the received echoes are temporarily stored in the memory 106. The digitized signals correspond to the backscattered waves received by each transducer element at different times. After being digitized, the signal may still retain the amplitude, frequency, and phase information of the backscattered wave. The memory 106 includes a parameter, an algorithm, one or more protocols of ultrasound examination, data values, and the like used by the controller circuit 102 to execute one or more operations described in the present application. The memory 106 may be a tangible and non-transitory computer-readable medium such as a flash memory, a random-access memory (RAM), a read-only memory (ROM), an electrically erasable programmable read-only memory (EEPROM), etc.

Optionally, the controller circuit 102 may retrieve the digitized signals stored in the memory 106 for use in the beam former processor. For example, the controller circuit 102 may convert the digitized signal into a baseband signal or compress the digitized signal.

In some embodiments, the controller circuit 102 may further include a beam forming processor. The beam forming processor may include one or more processors. If desired, the beam forming processor may include a central processing unit (CPU), one or more microprocessors, or any other electronic component capable of processing the input data according to specific logic instructions. Additionally or alternatively, the beam forming processor may execute instructions stored on a tangible and non-transitory computer-readable medium (e.g., the memory 106) to perform beam forming computation using any suitable beam forming method, such as adaptive beam forming, synthetic emission focusing, aberration correction, synthetic aperture, clutter suppression, and/or adaptive noise control, etc.

In some embodiments, the controller circuit 102 may further include a radio frequency (RF) processor. The beam forming processor executes beam forming on the digitized signals of the transducer elements, and outputs an RF signal. The RF signal is then provided to the RF processor for processing the RF signal. The RF processor may include one or more processors. If desired, the RF processor may include a central processing unit (CPU), one or more microprocessors, or any other electronic component capable of processing the input data according to specific logic instructions. Additionally or alternatively, the RF processor may execute instructions stored on a tangible and non-transitory computer-readable medium (e.g., the memory 106). Optionally, the RF processor may be integrated with and/or be part of the controller circuit 102. For example, operations described as being executed by the RF processor may be configured to be executed by the controller circuit 102.

The RF processor may generate, for a plurality of scanning planes or different scanning modes, different ultrasonic image data types and/or modes, e.g., B-mode, color Doppler (e.g., color blood flow, velocity/power/variance), tissue Doppler (velocity), and Doppler energy, on the basis of a predetermined setting of a first model. For example, the RF processor may generate tissue Doppler data for multiple scanning planes. The RF processor acquires the information (e.g., I/Q, B-mode, color Doppler, tissue Doppler, and Doppler energy information) related to a plurality of data pieces, and stores the data information in the memory 106, where the data information may include time stamp and orientation/rotation information.

Optionally, the RF processor may include a composite demodulator (not shown) for demodulating the RF signal to generate an IQ data pair representing an echo signal. The RF or IQ signal data may be provided directly to the memory 106 so as to be stored (e.g., stored temporarily). If desired, an output of the beam forming processor may be delivered directly to the controller circuit 102.

The controller circuit 102 may be configured to process the acquired ultrasonic data (e.g., RF signal data or an IQ data pair), and prepare and/or generate an ultrasound image data frame representing an anatomical structure of interest so as to display the same on the display apparatus 138. The acquired ultrasonic data may be processed by the controller circuit 102 in real time when an echo signal is received in a scanning or treatment process of ultrasound examination. Additionally or alternatively, the ultrasonic data may be temporarily stored in the memory 106 in a scanning process, and processed in a less real-time manner in live or off-line operations.

The memory 106 may be used to store the processed frames of the acquired ultrasonic data that are not scheduled to be immediately displayed, or may be used to store the post-processed images (e.g., shear wave images and strain images), firmware or software corresponding to, for example, a graphical user interface, one or more default image display settings, programmed instructions, and the like. The memory 106 may store a medical image, such as a 3D ultrasound image data set of ultrasonic data, where such a 3D ultrasound image data set is accessed to present 2D and 3D images. For example, the 3D ultrasound image data set may be mapped to corresponding memory 106 and one or more reference planes. Processing of ultrasonic data that includes the ultrasound image data set may be based in part on user input, e.g., a user selection received at the input device 142.

Different ultrasound imaging modes can provide different image information to the physician for reference. For example, two-dimensional ultrasound images and/or Doppler imaging may provide the physician with blood flow information for reference. The B-mode imaging in the two-dimensional ultrasound imaging can reflect the structural information of a patient's tissue; and by measuring the displacement of the tissue structure at different time phases, taking a cardiac scan as an example, the tissue strain, ejection fraction and right atrial pressure information can be obtained. Doppler imaging may include a variety of types. For example, color Doppler imaging in two-dimensional ultrasound imaging can provide a doctor with information on blood flow direction, blood flow velocity, etc. Spectral Doppler imaging can provide information on blood flow direction, blood flow velocity, blood flow signal strength, etc. In performing the above-described Doppler imaging, it is often necessary to perform reasonable positioning in the ultrasound image. In color Doppler imaging, a scanner typically needs to locate a region of interest to acquire the blood flow information at the region of interest. In pulse Doppler imaging, the scanner typically needs to locate a gate to acquire the blood flow information at the gate. In continuous Doppler imaging, the scanner typically needs to locate a sampling line to acquire the blood flow information in the direction of the sampling line. The selected location is often clinically significant, such as some specific anatomical locations or near a lesion, to ensure that the acquisition of blood flow information can reflect sufficient information. The selection of the above location depends on an input device (e.g., input device 142). Thus, in clinical scanning, the scanner is often required to operate the probe with one hand and select a location on the ultrasound image with the other hand via the input device. Furthermore, the scanner also needs to observe ultrasound images and blood flow information on the images. Thus, the scanner is greatly distracted. The inventors have found that trivial external factors (e.g., slight movement of the person being scanned, and inadvertent movement of the probe by the scanner.) will lead to a deviation of the already selected location that is difficult to perceive by the scanner. This results in a low scanning efficiency.

Figure 2:
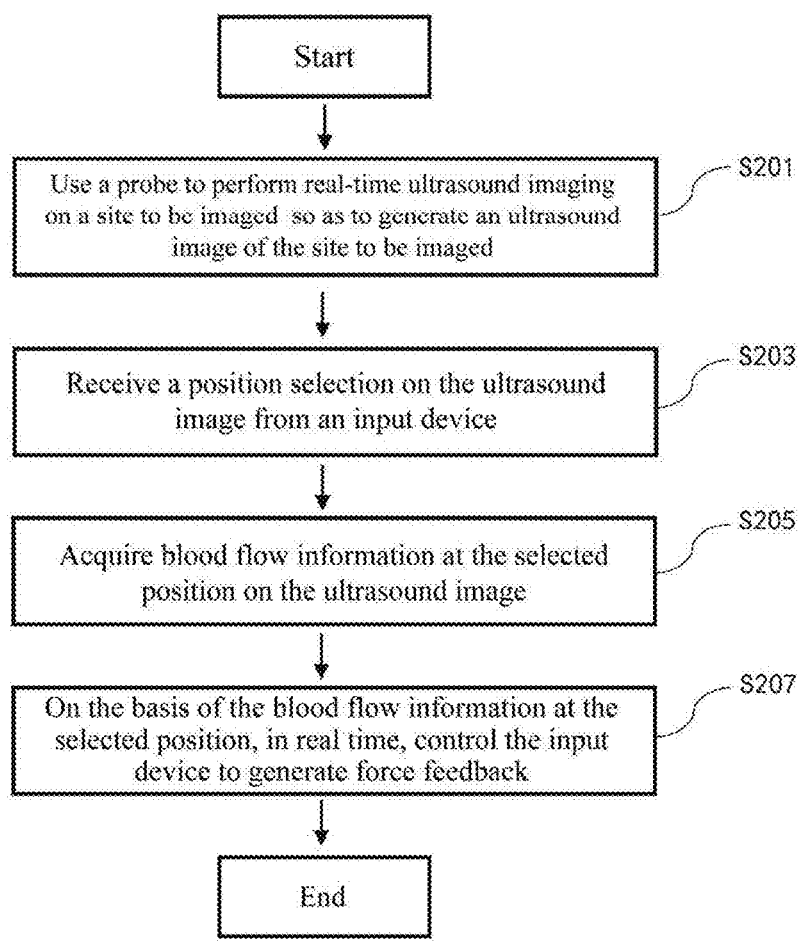
FIG. 2 is a schematic diagram of an ultrasound imaging method according to some embodiments of the present application.

At least in view of this, improvements are provided in some embodiments of the present application. Refer to FIG. 2 which shows a schematic diagram of an ultrasound imaging method 200 according to some embodiments of the present application.

In Step 201, a probe is used to perform real-time ultrasound imaging on a site to be imaged so as to generate an ultrasound image of the site to be imaged. The process may be implemented by a processor. For example, the process may be implemented by a processor of a controller circuit 102 in an ultrasound imaging system 100. The imaging mode may be selected by an operator controlling an input device 142. For example, two-dimensional B-mode imaging or color Doppler imaging may be selected. The site to be imaged may be the heart, the carotid artery, etc., which is not exhaustive.

In Step 203, a location selection on the ultrasound image is received from the input device. The step may be implemented by a processor. Specifically, when an operator manipulates the input device to select one or more locations on the ultrasound image, the input device will generate an input signal that is received by the processor, which in turn can receive the location selection. It may be understood that the input device may be any one in the ultrasound imaging system 100 described above and may be, for example, at least one among a touchpad or a trackball. Alternatively, it may be a keyboard, a touch screen or the like. It may be understood that the selection of the above locations may be different in different imaging modes or for different sites to be imaged, depending on the actual requirements. For example, when the site to be imaged is a blood vessel such as a carotid artery, the location may be a region of interest (ROI) having a certain area including a lesion (e.g., plaque). When the site to be imaged is the heart, the location may be a specific anatomical region, for example, an anatomical structure such as a mitral valve, an atrium, and a ventricle. Alternatively, in a color flow imaging mode, the location may be an adjusted box. In a pulse wave Doppler imaging mode, the location may be a Doppler gate. In a continuous wave Doppler imaging mode, the location may be a sampling line covering a cursor. The foregoing will not be further enumerated.

In Step 205, blood flow information at the selected location on the ultrasound image is acquired. For example, the processor may continuously receive the signals related to the blood flow collected by the probe in real time, and by processing the signals, can obtain the blood flow information at the selected location. The blood flow information may include various aspects, for example, at least one among blood flow signal strength, blood flow velocity, and blood pressure. These information may be obtained by processing the ultrasonic echo signals received from the probe by the processor, and the specific processing method may be any one in the prior art. For example, the blood flow signal strength and blood flow velocity may be directly obtained by different imaging methods, and the blood pressure (e.g., right atrial pressure) may be obtained by the measurement function of the ultrasound imaging system in the B mode. In addition, the processing method may also be described above in the present application, which will not be described in detail.

In Step 207, the input device is controlled in real time on the basis of the blood flow information at the selected location to generate force feedback. Specifically, the processor may acquire the blood flow information in real time, and control the input device to generate the force feedback according to the blood flow information in real time. It may be understood that the controller for the force feedback is the processor, the control is based on the blood flow information obtained in real time, the object of control is the input device, and the object of force feedback may be a part of the operator that is touching the input device, such as the hand.

The inventors have realized that when performing ultrasound imaging, such as blood flow imaging, an operator typically needs to maintain contact with the input device with one hand in order to adjust the ultrasound imaging system instantaneously. Further, by configuring the method 200 as described herein, the operator's attention can be greatly focused. The blood flow information collected by the ultrasound imaging system is no longer entirely dependent on the operator's view through the eyes, but can be more directly fed back through the tactile sensation created by contact with the input device. The gaze of the operator can be more focused for operations such as adjusting the selection of location, observing non-blood flow information, adjusting the location of the probe, etc. These operations, in turn, may derive a result feedback directly from the force feedback of the input device.

As noted above in the present application, in some embodiments, the blood flow information may include at least one among blood flow signal strength, blood flow velocity, and blood pressure. In addition, in other embodiments, the force feedback may include at least one among vibration and pressing resistance. In other words, the processor may cause the input device to generate vibration or pressing resistance based on the blood flow signal strength, blood flow velocity, or blood pressure, or may make real-time changes to the generated vibration or pressing resistance according to the blood flow information. Such generation or change can be intuitively felt by the operator, and in particular, in the case of a change in the blood flow signal, the force feedback described above also changes along, and the operator can get the feedback in time.

The vibration may be fed back as a force in various ways, for example, a feedback of the frequency of the vibration, the strength of the vibration. The feedback of the pressing resistance may be a feedback of the magnitude of the pressing resistance. In some embodiments, the strength of the force feedback may be associated with the strength of the blood flow signal. For example, at least one among the frequency of the vibration, the strength of the vibration, and the pressing resistance is associated with at least one among the value of the blood flow signal strength, the value of the blood flow velocity, and the value of the blood pressure. In some embodiments, the frequency of the vibration may be used to map the blood flow signal strength at the current location, the strength of the vibration may be used to map the velocity of the blood flow, and the magnitude of the pressing resistance may be used to map the magnitude of the blood pressure. The above mapping relationships may also be of other types, which will not be further enumerated. In addition, the corresponding relationship between the strength of the force feedback and the strength of the blood flow signal may be stored in the memory in advance, and after measuring the current strength of the blood flow signal, the processor may search the memory for the corresponding strength of the force feedback and control the input device to execute corresponding adjustment. In other embodiments, the mapping relationship and/or magnitude corresponding relationship between the force feedback and the blood flow signal may also be pre-defined by the operator.

The inventors have further realized that the blood flow information at a particular anatomical location may be dynamically changing. For example, at the mitral valve, the blood flow information such as the blood flow signal strength and blood flow velocity changes periodically. Moreover, the information required to be grasped by the operator varies depending on the actual needs. For example, in some cases, the operator is more concerned with the maximum blood flow velocity/signal strength/blood pressure. In other cases, the operator is concerned with the periodic change rules of the blood flow information. At least in consideration of the above factors, in some embodiments of the present application, the value of the blood flow signal strength and the value of the blood flow velocity include at least one among a real-time measured value, a maximum value, and an average value.

By mapping the above different types of values and force feedback, the operator can obtain the required information from tactile sensation. For example, mapping the real-time measured value to the force feedback allows the operator to dynamically grasp the periodic rules of blood flow change in real time; and the tactile sensation is more sensitive and intuitive than visually observing the image. Alternatively, mapping the maximum/average values to the force feedback allows the operator to more intuitively compare the changes in blood flow information at different locations. For example, the operator can feel the changes in the blood flow information caused by a change in the location in real time when manipulating the input device to control the change in the selected location.

In some embodiments, the values of the blood flow signal strength and the blood flow velocity are configured to be selected by a user (e.g., an operator) to include one or more among a real-time measured value, a maximum value, and an average value. That is, the user may associate one or more of the real-time measured value, the maximum value, and the average value with the force feedback according to the actual clinical needs, so that the user can intuitively obtain the required information through contact with the input device.

As noted above in the present application, in some embodiments, the apparatus for controlling the input device to generate force feedback may be a force feedback control unit. For example, it may be a force feedback control unit 150 shown in FIG. 1, and the force feedback control unit is connected to the input device and is used to receive a signal from the processor to execute force feedback adjustment on the input device. It is not difficult to understand, according to the above description of the present application, that the manner of force feedback adjustment may be varied, which may include controlling at least one among the vibration strength, vibration frequency, and pressing resistance of the input device. When the force feedback adjustment includes control of the vibration strength and the vibration frequency, the force feedback control unit may be any apparatus capable of generating and adjusting vibration in the prior art, e.g., any vibration generating apparatus such as an eccentric motor and a piezoelectric vibrator. When the force feedback adjustment includes control of the pressing resistance, the force feedback control unit may be any apparatus capable of generating an adjustable repulsive force against the pressing force in the prior art, e.g., any force generating apparatus such as an electromagnet, an air cylinder, and a linear motor. When the force feedback adjustment includes a common control of the vibration and the pressing resistance, the force feedback control unit may also be a combination of a plurality of the above-described apparatuses. Furthermore, the force feedback control unit may be directly connected to the input device such that vibration and/or pressing resistance feedback is transmitted to the input device and ultimately perceived by the user. In other embodiments, the force feedback control unit may also be directly integrated on the input device to reduce the following exemplary description of the structure of the force feedback control unit, but it should be noted that the following description is only a preferred embodiment of the present application and does not constitute a unique limitation of the force feedback control unit.

Figure 3:
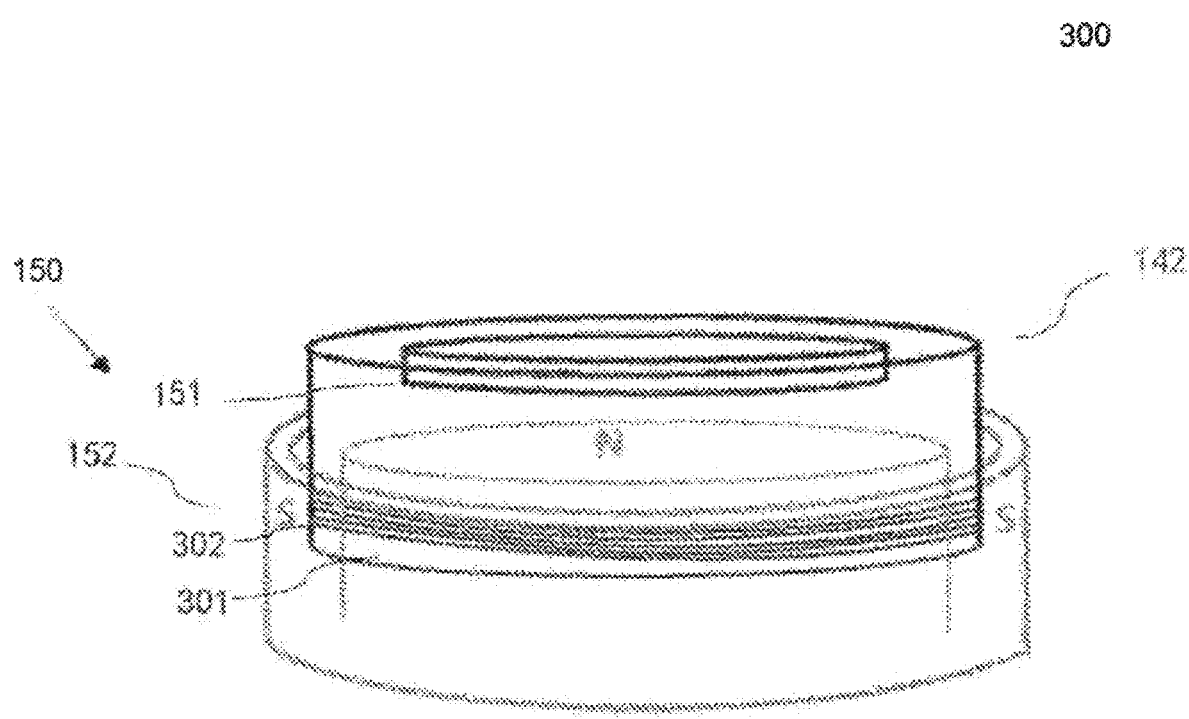
FIG. 3 is a schematic diagram of an input device connected to a force feedback unit according to some embodiments of the present application.

Refer to FIG. 3 which shows a schematic diagram 300 of an input device 142 connected to a force feedback unit 150. As shown in FIG. 3, the input device 142 is shown in this embodiment in the form of a touchpad. The internal structure and electrical connection structure of the touchpad are any one in the prior art, and will not be described in detail here.

In some embodiments, the force feedback unit 150 may include a vibration feedback control unit 151. As shown in FIG. 3, the vibration feedback control unit 151 may be a piezoelectric vibrator. For example, the vibration feedback control unit 151 may include a piezoelectric material and a corresponding circuit, and can be controlled to generate vibration feedback as the processor controls a current applied to the piezoelectric material. The vibration feedback control unit 151 may be directly connected to the input device 142. For example, it may be connected to the lower surface of the touchpad such that the vibration generated by the vibration feedback control unit 151 can be directly perceived by a user touching the upper surface of the touchpad. By controlling parameters such as the intensity and frequency of the current applied, the vibration strength and frequency of the piezoelectric vibrator can be easily controlled, to eventually achieve an effect of controlling the vibration strength and vibration frequency of the input device 142. It should be noted that other types of vibration generating apparatuses and the selection of the mounting positions thereof are also allowed under the teachings of this embodiment.

In other embodiments, the vibration feedback control unit 151 may include a pressing resistance control unit 152, or a combination of the pressing resistance control unit 152 and the vibration feedback control unit 151. As shown in FIG. 3, the pressing resistance control unit 152 may execute pressing resistance control using a magnetic field of an electromagnetic coil. In a non-limiting embodiment, the pressing resistance control unit 152 may include a magnet 301 and a coil 302. Where, the coil 302 is connected to the input device 142, and a power supply circuit (not shown). When the processor adjusts the pressing resistance, the intensity of the current output to the coil 302 may be adjusted to cause the coil 302 to generate a magnetic field. The magnetic field direction of the coil 302 may be opposite to the magnetic field direction of the magnet 301, thereby generating a repulsive force. The repulsive force acts on the input device 142 and can be perceived by a user pressing the input device 142. The magnitude of the repulsive force can be controlled according to the intensity of the current. The stronger the current intensity, the stronger the magnetic field of the coil 302 and correspondingly the larger the repulsive force; and on the contrary, the repulsive force is smaller. Thus, the control of the pressing resistance of the input device 142 is realized. Furthermore, it may be understood that the above-described embodiments are merely preferred implementations of the present application. Other types of pressing resistance control apparatuses and the selection of the mounting positions thereof are also allowed under the teachings of this embodiment.

Figure 4:
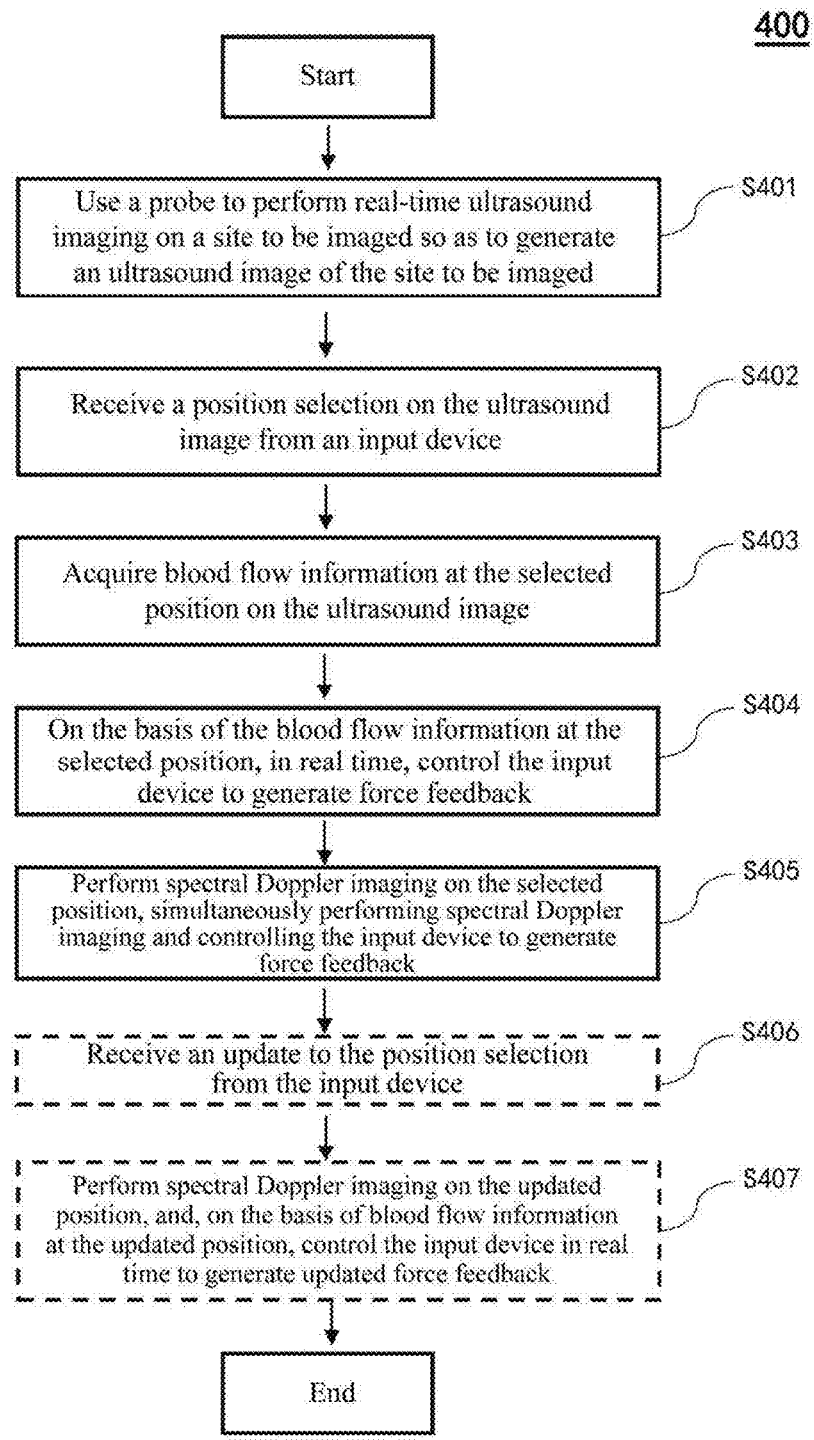
FIG. 4 is a schematic diagram of an ultrasound imaging method according to some other embodiments of the present application.

The inventors have further realized that the method of the present application has other advantages in specific scenarios of blood flow imaging. Detailed description is provided below. Refer to FIG. 4 which shows a schematic diagram of an ultrasound imaging method 400 according to some other embodiments of the present application.

In Step 401, a probe is used to execute real-time ultrasound imaging on a site to be imaged so as to generate an ultrasound image of the site to be imaged.

In Step 402, a location selection on the ultrasound image is received from the input device.

In Step 403, blood flow information at the selected location on the ultrasound image is acquired.

In Step 404, the input device is controlled in real time on the basis of the blood flow information at the selected location to generate force feedback.

It may be understood that, for specific implementations and effects of the above steps 401 to 404, reference may be made to the embodiments of the steps 201 to 207 of the ultrasound imaging method 200, which is not described again here.

The imaging method 400 further includes a step 405 of performing spectral Doppler imaging on the selected location, and said spectral Doppler imaging and controlling the input device to generate force feedback are configured to be performed simultaneously. This step may be executed by the processor. In some embodiments, the processor may switch the imaging mode to spectral Doppler imaging according to the user's selection. For example, the user may perform the above-described switching of the imaging mode by operating a key or the like.

When switching to spectral Doppler imaging, the selection of location is usually more stringent. For example, when the spectral Doppler imaging is pulsed wave Doppler imaging, the location is usually a gate for the pulsed wave Doppler, and once the gate changes, the obtained pulsed wave Doppler spectrum will be greatly affected; and the gate is often small in size and difficult to perceive. Alternatively, when the spectral Doppler imaging is continuous wave Doppler imaging, the location is usually a sampling line of continuous wave Doppler, and the location selection of the sampling line is also very demanding and a change in location is not easily perceived compared to a ROI box. In Step 405 of the present application, spectral Doppler imaging is configured to be performed simultaneously with the process of controlling the input device to generate force feedback. In this way, a displacement change of the gate or sampling line may no longer need to be observed by the naked eyes, but may be more directly fed back by tactile sensation. Thus, the operator is more focused on observing the waveform of continuous wave Doppler imaging.

Figure 5:
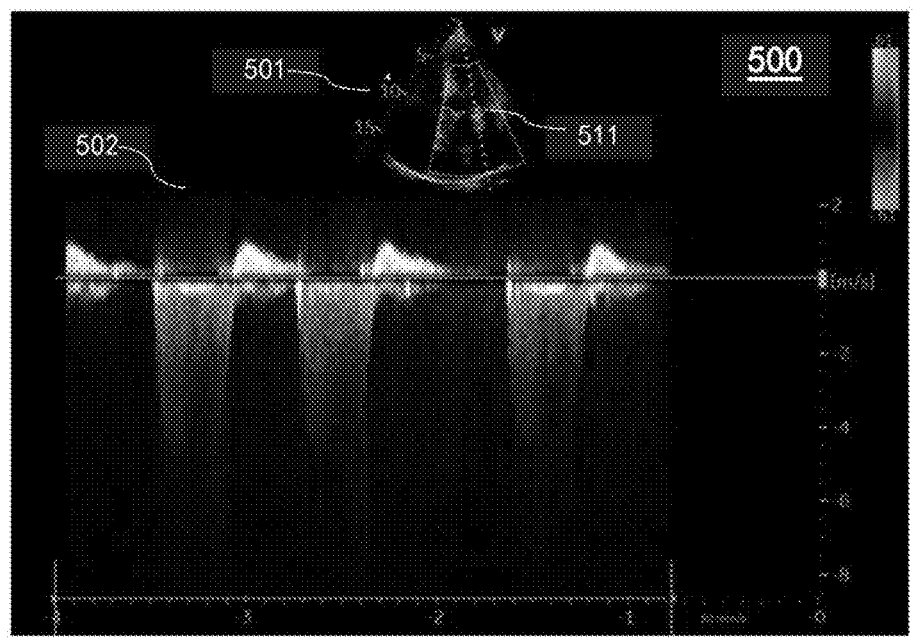
FIG. 5 is a schematic diagram of spectral Doppler imaging according to some embodiments of the present application.

In some scenarios, the ultrasound image of the site to be imaged is configured for real-time display; and when performing said spectral Doppler imaging, an image of the spectral Doppler imaging is displayed in real time, and the ultrasound image is not displayed or is displayed in a reduced size. FIG. 5 is used for exemplary illustration of such scenarios.

Referring to FIG. 5, a schematic diagram 500 of spectral Doppler imaging according to some embodiments of the present application is shown. It includes a 2D color ultrasound image 501 and a Doppler spectrum 502 at a selected location 511 on the image 501. As can be seen from FIG. 5, the Doppler spectrum 502 occupies most of the picture, while the ultrasound image 501 is displayed in a reduced size. Further, the selected location 511 is more difficult to perceive clearly from the image. At this time, it is difficult to determine whether the selected location 511 is correctly placed simply by visual observation. Moreover, even if the location is placed correctly at the beginning, subsequent inadvertent movement will be hard to perceive. In the embodiments of the present application, since a tactile feedback may be given to an operator by means of force feedback, the operator may fix the line of sight on the Doppler spectrum 502 and can determine whether the location 511 is undesirably moved by a tactile change.

It may be understood that, although FIG. 5 shows a scenario of displaying the ultrasound image 501 in a reduced size, the ultrasound image 501 may also be configured not to be displayed in some other embodiments with the aid of the above-described implementations of the present application. The operator is still able to know whether the selected location on the ultrasound image has changed by feeling the force feedback.

Refer back to FIG. 4. In Step 406, an update of the location selection is received from the input device. The step may be implemented by a processor. In particular, when an operator manipulates the input device to select an update of one or more locations of the ultrasound image, the input device will generate an input signal that is received by the processor, which in turn can receive the update of the location selection.

In some other embodiments, the update of the location selection may not be generated by the operator controlling the input device. For example, it may be caused by a small movement of the probe, a movement of the person to be scanned or other factors, i.e. a change in the location of the ultrasound image may cause a change in the relative position between the ultrasound image and the selected location.

In Step 407, spectral Doppler imaging is performed on the updated location while, on the basis of blood flow information at the updated location, controlling the input device in real time to generate updated force feedback. The step may be implemented by a processor. The processor may continuously generate updated force feedback to the input device based on the blood flow information.

With the above arrangement, the operator can perceive in real time whether the updated location meets expectations. In one scenario, the location update is caused by an unexpected movement, and the implementations of the present application can ensure that such an accident is promptly perceived. In another scenario, the location update is under the control of the operator, and the implementations of the present application can ensure that the operator finds an appropriate location (e.g., a location with the largest pressing resistance, largest vibration frequency and/or largest vibration strength) based on the force feedback.

Some embodiments of the present application further provide an ultrasound imaging system, which may be as shown in FIG. 1 or any other one. The system may include: a probe for sending an ultrasound signal to a site to be imaged and receiving an echo signal from the site to be imaged; an input device for receiving an input from a user to control the system; a processor for executing the method as set forth in any of the above embodiments of the present application; and a display apparatus for receiving a signal from the processor and performing display.

Some embodiments of the present application further provide a non-transitory computer-readable medium, where the non-transitory computer-readable medium has a computer program stored thereon, the computer program has at least one code segment, and the at least one code segment is executable by a machine so as to enable the machine to execute the steps of the method in any of the above embodiments.

Correspondingly, the present disclosure may be implemented by means of hardware, software, or a combination of hardware and software. The present disclosure may be implemented in at least one computer system in a centralized manner, or implemented in a distributed manner; and in the distributed manner, different elements are distributed on a plurality of interconnected computer systems. Any type of computer system or other apparatus suitable for implementing the methods described herein is considered to be appropriate.

Various embodiments may also be embedded in a computer program product, which includes all features capable of implementing the methods described herein, and the computer program product is capable of executing these methods when loaded into a computer system. The computer program in this context means any expression in any language, code, or symbol of an instruction set intended to enable a system having information processing capabilities to execute a specific function directly or after any or both of the following: a) conversion to another language, code, or symbol; and b) replication in different material forms.

The purpose of providing the above specific embodiments is to facilitate understanding of the content disclosed in the present invention more thoroughly and comprehensively, but the present invention is not limited to these specific embodiments. Those skilled in the art should understand that various modifications, equivalent replacements, and changes can also be made to the present invention and should be included in the scope of protection of the present invention as long as these changes do not depart from the spirit of the present invention.

The invention claimed is:

1. An ultrasound imaging method, comprising:
    controlling a probe to perform real-time ultrasound imaging on a site to be imaged so as to generate an ultrasound image of the site to be imaged;
    receiving a selection of a location on the ultrasound image from an input device;
    acquiring a plurality of types of blood flow information at the selected location on the ultrasound image; and
    controlling the input device to generate a plurality of types of force feedback that are respectively mapped to the plurality of types of blood flow information at the selected location.

2. The ultrasound imaging method according to claim 1, wherein:

the input device comprises at least one among a touchpad and a trackball.

3. The ultrasound imaging method according to claim 1, wherein:
the plurality of types of blood flow information comprise a blood flow signal strength, a blood flow velocity, and a blood pressure, and the plurality of types of force feedback comprise a frequency of vibration, a strength of the vibration, and a magnitude of a pressing resistance.

4. The ultrasound imaging method according to claim 3, wherein:
the frequency of the vibration is mapped to the blood flow signal strength, the strength of the vibration is mapped to a value of the blood flow velocity, and the magnitude of the pressing resistance is mapped to a value of the blood pressure.

5. The ultrasound imaging method according to claim 4, wherein:
the value of the blood flow signal strength and the value of the blood flow velocity comprise a maximum value or an average value.

6. The ultrasound imaging method according to claim 1, further comprising:
performing spectral Doppler imaging on the selected location, and said spectral Doppler imaging and controlling the input device to generate the plurality of types of force feedback being configured to be performed simultaneously.

7. The ultrasound imaging method according to claim 6, wherein the ultrasound image of the site to be imaged is configured for real-time display; and when performing said spectral Doppler imaging, an image of said spectral Doppler imaging is displayed in real time, and the ultrasound image is not displayed or is displayed in a reduced size.

8. The ultrasound imaging method according to claim 6, wherein:
said spectral Doppler imaging comprises at least one among pulse Doppler imaging and continuous Doppler imaging.

9. The ultrasound imaging method according to claim 6, further comprising:
receiving an update to the selected location from the input device;
performing spectral Doppler imaging on the updated location; and
on the basis of blood flow information at the updated location, controlling the input device in real time to generate updated force feedback.

10. An ultrasound imaging system, comprising:
a probe for sending an ultrasound signal to a site to be imaged and receiving an echo signal from the site to be imaged;
an input device for receiving an input from a user to control the system;
a processor configured to:
control the probe to perform real-time ultrasound imaging on the site to be imaged to generate an ultrasound image of the site to be imaged;
receive a selection of a location on the ultrasound image from the input device;
acquire a plurality of types of blood flow information at the selected location on the ultrasound image; and
control the input device to generate a plurality of types of force feedback that are respectively mapped to the plurality of types of blood flow information at the selected location; and
a display for receiving a signal from the processor and performing display.

11. The ultrasound imaging system according to claim 10, further comprising:
a force feedback device, the force feedback device being connected to the input device and being used to receive a signal from the processor to perform force feedback regulation on the input device.

12. The ultrasound imaging system according to claim 11, wherein:
said force feedback regulation comprises controlling at least one among vibration strength, vibration frequency, and pressing resistance of the input device.

13. The ultrasound imaging system according to claim 10, wherein the processor is further configured to control the input device to generate force feedback in real-time based on the plurality of types of blood flow information at the selected location.

14. A non-transitory computer-readable medium, the non-transitory computer-readable medium having a computer program stored thereon, the computer program having at least one code segment, and the at least one code segment being executable by a machine to enable the machine to execute the steps of:
controlling a probe to perform real-time ultrasound imaging on a site to be imaged to generate an ultrasound image of the site to be imaged;
receiving a selection of a location on the ultrasound image from an input device;
acquiring a plurality of types of blood flow information at the selected location on the ultrasound image; and
controlling the input device to generate a plurality of types of force feedback that are respectively mapped to the plurality of types of blood flow information at the selected location.

* * * * *